UNITED STATES PATENT OFFICE.

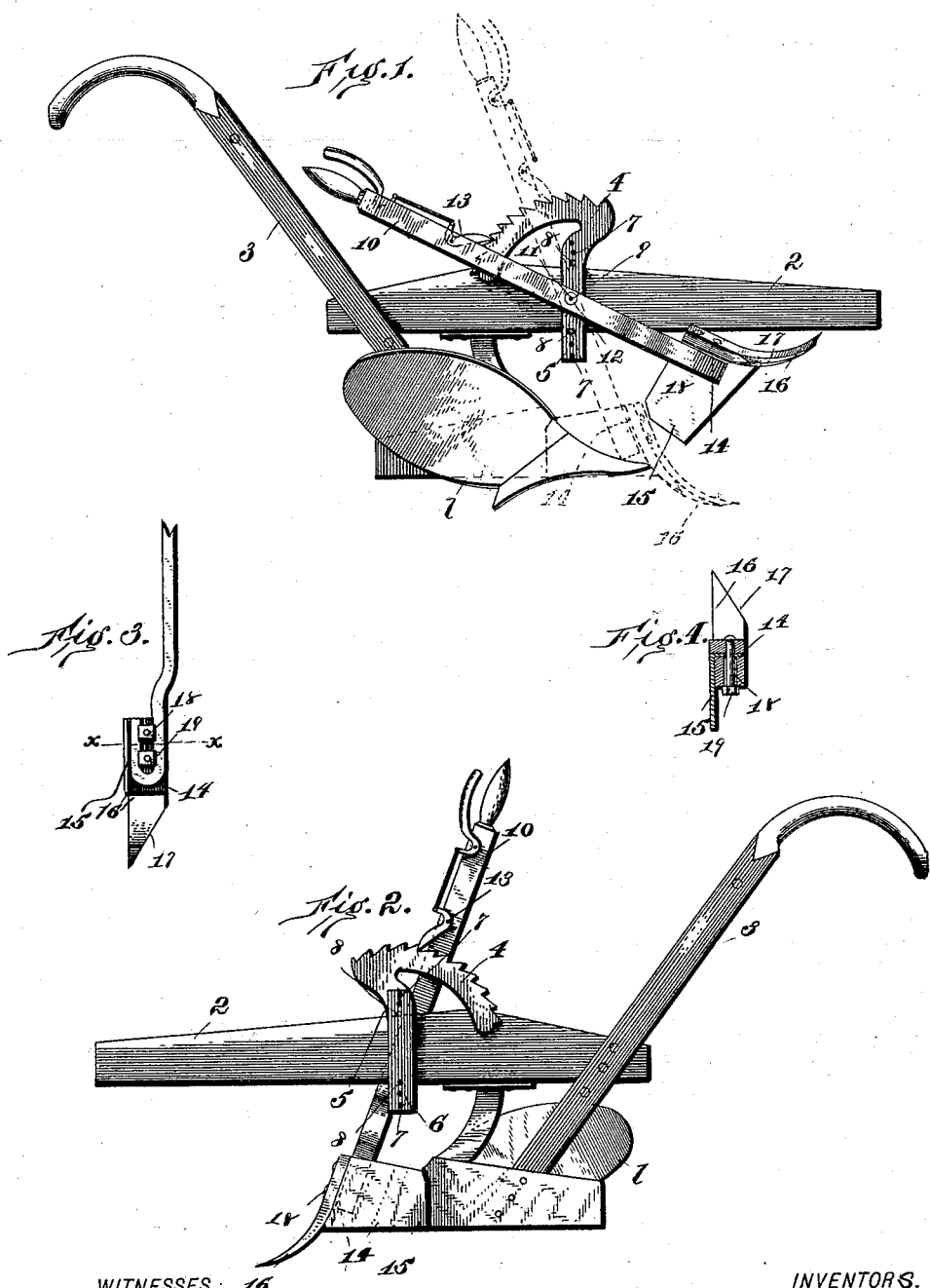

GEORGE A. MABRY AND JOHN T. MORGAN, OF ROSWELL, GEORGIA.

PLOW.

SPECIFICATION forming part of Letters Patent No. 628,603, dated July 11, 1899.

Application filed August 20, 1898. Serial No. 689,154. (No model.)

*To all whom it may concern:*

Be it known that we, GEORGE A. MABRY and JOHN T. MORGAN, of Roswell, in the county of Cobb and State of Georgia, have invented certain new and useful Improvements in Plows; and we do hereby declare that the following is a full, clear, and exact description of the invention, which will enable others skilled in the art to which it appertains to make and use the same, reference being had to the accompanying drawings, and to the figures of reference marked thereon, which form part of this specification.

This invention relates to subsoil attachments for plows, its object being to provide such an attachment which may be attached to any ordinary turning-plow to work in advance of the plow-point in a furrow already made and to so connect the attachment to the plow-beam that it may be easily and quickly moved into or out of operative position.

With these objects in view the invention consists of the several details of construction, combination, and arrangement of parts, as will be hereinafter fully described, and the novel features of which will be defined in the claims.

In the drawings, Figure 1 is a side elevation of a plow provided with our improved attachment, the latter being in inoperative position. Fig. 2 is a similar view taken from the opposite side and showing the attachment in operative position. Fig. 3 is a rear view of the subsoil attachment, the lever being partly broken away. Fig. 4 is a horizontal section on the line *x x* of Fig. 3.

Similar reference-numerals indicate similar parts in the several figures.

1 indicates an ordinary turning-plow, 2 the plow-beam, and 3 the plow-handles. 4 is a notched curved bar, one end 5 of which is extended in a straight line and bears against one side of the plow-beam. On the opposite side of the plow-beam we employ a short straight bar 6, and the latter, as well as the end portion 5 of the curved bar, is provided with a series of holes 7 to receive the clamping-bolts 8, one above and the other below the plow-beam. By this arrangement the curved bar can be easily and firmly secured to any ordinary-sized plow-beam. The end portion 5 of the curved bar has a pin 9 projecting outwardly from it, on which the lever 10 is pivoted. Any suitable means may be employed to retain the lever on the pin, such as a nut 11 and washer 12, as indicated in the drawings. The lever is provided with the ordinary spring-latch 13 to engage the notches in the quadrant, the pivot-pin being the center from which the curve in the bar is struck.

Referring now to Figs. 3 and 4, it will be seen that the lower end portion of the lever is bent into U shape and that one member 14 of an angle-plate rests against the front edges of the arms of the U-shaped portion, while the other member 15 of the plate rests against the side of one of said arms. The subsoiler proper is indicated by 16, and consists of a curved plate of any desired length and width. Its lower end will preferably be formed with an obliquely-disposed cutting edge, as indicated at 17, while its upper portion will rest against the member 14 of the angle-plate. One or more securing-bolts 18 will extend through the subsoiler, the member 14, and the space between the arms of the U-shaped portion of the lever, and a nut 19 will be secured on each bolt to engage the rear edges of said arms, and thereby securely clamp the angle-plate and subsoiler to the lever. The member 15 of the angle-plate extends rearwardly beyond the lever and when the subsoiler is in operative position will engage the landside of the plow and hold the subsoiler stationary on the points of the plow.

This attachment is designed to be used principally on hillsides where the land is preferably all turned one way, the invention being to turn a furrow going one way and subsoil going back in the same furrow. The device can, however, be used to equal advantage on level land.

The operation of the device will be readily understood, as the operator will simply use the lever to throw the subsoiler into or out of operative position. When the plow is turning a furrow, the subsoiler will be elevated as in Fig. 1, and when the subsoiler is used as in Fig. 2 the plow will not turn the land, but simply run along the old furrow.

It is to be understood that changes in the form, proportions, and minor details of construction may be resorted to without departing from the spirit or sacrificing any of the advantages of our invention.

Having described the invention, we claim—

1. The combination with a turning-plow, of a subsoiler pivoted to the plow-beam and movable into operative position in contact with the plow-point and in advance thereof and having a plate attached thereto to engage the landside of the plow substantially as specified.

2. The combination with a turning-plow, of a lever pivoted to the plow-beam, a subsoiler connected to the lower end of the lever to work in advance of the plow-point, and a plate secured to the lever to engage the landside of the plow when the subsoiler is operating substantially as specified.

3. The combination with a turning-plow, of a notched curved bar having one of its ends extended in substantially a straight line, a pivot-pin projecting from the straight extension and forming the center from which the curve of the bar is struck, a lever pivoted on said pin, a subsoiler carried by the lower end of the lever, a plate attached to the subsoiler to engage the landside of the plow when the subsoiler is operating and a spring-latch on the lever to engage the notches in the bar substantially as described.

4. The combination with a turning-plow, of a lever pivoted to the plow-beam and having its lower end portion bent into U form, an angle-plate one wing of which rests against the front edges of the arms of the U portion of the lever and the other wing being adapted to engage the landside of the plow as described, a subsoiler resting against the angle-plate, and a clamping-bolt extending through the subsoiler, the angle-plate and the space between the arms of the U portion of the lever, substantially as specified.

In testimony that we claim the foregoing as our own we affix our signatures in presence of two witnesses.

GEORGE A. MABRY.
JOHN T. MORGAN.

Witnesses:
S. B. JONES,
M. S. MOYER.